United States Patent
Deng et al.

(10) Patent No.: US 8,806,435 B2
(45) Date of Patent: Aug. 12, 2014

(54) REMOTE LOGGING MECHANISM (75) Inventors: Ying'an Deng, Shanghai (CN); Rui Jian, Shanghai (CN); Caidong Song, Shanghai (CN); Yuanhao Sun, Shanghai (CN); Zhi Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1218 days.

(21) Appl. No.: 10/550,851

(22) PCT Filed: Dec. 31, 2004

(86) PCT No.: PCT/CN2004/001586
§ 371 (c)(1),
(2), (4) Date: Sep. 7, 2007

(87) PCT Pub. No.: WO2006/069491
PCT Pub. Date: Jul. 6, 2006

(65) Prior Publication Data
US 2008/0109675 A1    May 8, 2008

(51) Int. Cl.
*G06F 9/44* (2006.01)
*G06F 11/00* (2006.01)

(52) U.S. Cl.
USPC ........... 717/124; 717/125; 717/127; 717/128; 717/130; 717/131; 714/25; 714/38.1; 714/38.14

(58) Field of Classification Search
USPC ................. 717/124, 125, 127, 128, 130, 131; 714/25, 38, 43
See application file for complete search history.

(56) References Cited

U.S. PATENT DOCUMENTS

| | | | |
|---|---|---|---|
| 5,575,719 A | | 11/1996 | Gobush et al. |
| 5,689,577 A | | 11/1997 | Arata |
| 5,969,822 A | | 10/1999 | Fright et al. |
| 5,983,366 A | * | 11/1999 | King ......................... 714/38.13 |
| 6,061,517 A | * | 5/2000 | House et al. .................. 717/115 |
| 6,101,607 A | * | 8/2000 | Bachand et al. ................ 726/17 |
| 6,185,623 B1 | | 2/2001 | Bailey et al. |
| 6,202,199 B1 | * | 3/2001 | Wygodny et al. ............. 717/125 |
| 6,241,622 B1 | | 6/2001 | Gobush |
| 6,279,124 B1 | * | 8/2001 | Brouwer et al. ................ 714/38 |
| 6,533,674 B1 | | 3/2003 | Gobush |
| 6,618,823 B1 | * | 9/2003 | West ............................... 714/25 |

(Continued)

FOREIGN PATENT DOCUMENTS

| | | |
|---|---|---|
| CN | 1118473 | 3/1996 |
| CN | 1372662 | 10/2002 |

(Continued)

OTHER PUBLICATIONS

Provisional U.S. Appl. No. 60/711,923, filed Aug. 26, 2005, 4 pgs.

(Continued)

*Primary Examiner* — Charles Swift
(74) *Attorney, Agent, or Firm* — Blakely, Sokoloff, Taylor & Zafman LLP (57) ABSTRACT

A method and system to remotely log debug information is described. A computer executing program code generates debug information upon the occurrence of an error in execution. The debug information is then sent to a remote computer using a network adaptor. In one embodiment, the computer executing the program is Extensible Firmware Interface (EFI) compliant.

20 Claims, 5 Drawing Sheets

(56) References Cited

U.S. PATENT DOCUMENTS

| | | | |
|---|---|---|---|
| 6,685,326 B2 | 2/2004 | Debevec | |
| 6,758,759 B2 | 7/2004 | Gobush et al. | |
| 6,826,746 B2 * | 11/2004 | Evans et al. | 717/124 |
| 6,983,334 B2 | 1/2006 | Riedle | |
| 6,983,452 B1 * | 1/2006 | Willems | 717/128 |
| 7,044,613 B2 | 5/2006 | Debevec | |
| 7,086,954 B2 | 8/2006 | Gobush et al. | |
| 7,100,078 B1 | 8/2006 | Pass | |
| 7,171,651 B1 * | 1/2007 | Greenberg et al. | 717/120 |
| 7,188,331 B2 * | 3/2007 | Culter | 717/100 |
| 7,299,455 B2 * | 11/2007 | Anderson et al. | 717/127 |
| 7,305,585 B2 | 12/2007 | Marchand | |
| 7,343,588 B2 * | 3/2008 | Bates et al. | 717/125 |
| 7,426,422 B2 | 9/2008 | Carman et al. | |
| 7,436,403 B2 | 10/2008 | Debevec | |
| 7,664,109 B2 | 2/2010 | L | |
| 2002/0120919 A1 * | 8/2002 | Aizenbud-Reshef et al. | 717/127 |
| 2003/0046663 A1 * | 3/2003 | Rogers et al. | 717/125 |
| 2003/0069930 A1 | 4/2003 | Van Willigen | |
| 2003/0079022 A1 | 4/2003 | Toporek et al. | |
| 2003/0088667 A1 | 5/2003 | Riedle | |
| 2003/0206549 A1 | 11/2003 | Mody | |
| 2004/0119716 A1 | 6/2004 | Park et al. | |
| 2004/0199671 A1 * | 10/2004 | Kaneko et al. | 709/249 |
| 2004/0226007 A1 * | 11/2004 | Guarraci | 717/158 |
| 2005/0008664 A1 | 1/2005 | Claxton et al. | |
| 2005/0034024 A1 * | 2/2005 | Alverson et al. | 714/38 |
| 2005/0040085 A1 | 2/2005 | Carman et al. | |
| 2005/0071243 A1 * | 3/2005 | Somasekaran et al. | 705/26 |
| 2005/0086644 A1 * | 4/2005 | Chkodrov et al. | 717/124 |
| 2005/0114073 A1 | 5/2005 | Gobush | |
| 2005/0143183 A1 | 6/2005 | Shirai | |
| 2005/0161118 A1 | 7/2005 | Carman et al. | |
| 2005/0168578 A1 | 8/2005 | Gobush | |
| 2005/0182842 A1 | 8/2005 | Walsh et al. | |
| 2005/0215336 A1 | 9/2005 | Ueda et al. | |
| 2005/0215337 A1 | 9/2005 | Shirai | |
| 2005/0223368 A1 * | 10/2005 | Smith et al. | 717/128 |
| 2005/0240828 A1 * | 10/2005 | Rothman et al. | 714/43 |
| 2005/0268187 A1 * | 12/2005 | Meaney et al. | 714/723 |
| 2007/0060410 A1 | 3/2007 | Gobush | |
| 2007/0192412 A1 | 8/2007 | Xu et al. | |
| 2008/0168157 A1 | 7/2008 | Marchand | |

FOREIGN PATENT DOCUMENTS

| | | |
|---|---|---|
| CN | 1383070 A | 12/2002 |
| CN | 1470018 | 1/2004 |
| CN | 101088070 | 12/2007 |
| JP | 2000215080 A | 8/2000 |
| WO | WO0007100 A1 | 2/2000 |
| WO | WO-0140940 | 6/2001 |
| WO | WO-2005046125 | 5/2005 |
| WO | WO-2006/011153 | 2/2006 |
| WO | WO-2006094426 | 9/2006 |

OTHER PUBLICATIONS

Provisional U.S. Appl. No. 60/711,905, filed Aug. 26, 2005, 4 pgs.
Notice of Allowance from U.S. Appl. No. 11/449,043, mailed Apr. 30, 2009, pp. 11.
Notice of Allowance from U.S. Appl. No. 11/077,628, mailed May 15, 2009, pp. 6.
Allen, Bret, et al., "Articulated Body Deformation from Range Scan Data", ACM Transactions on Graphics (TOG), vol. 21, No. 3, (Jul. 2002), pp. 612-619.
Curless, Brian, et al., "A Volumetric Method for Building Complex Models from Range Images", Proceedings of the 23rd Annual Conference on Computer Graphics and Interactive Techniques, (1996), pp. 1-10.
Second Office Action from Foreign Counterpart China Serial No. 200480044672.7 mailed Oct. 8, 2010, 4 pgs.
Nonnenmacher, Ernst B., et al., "Parity-Based Loss Recovery for Reliable Multicast Transmission", IEEE/ACM Transactions on Networking, vol. 6, No. 4, Aug. 4, 1008, pp. 349-362.
International Search Report and Written Opinion from PCT/CN2005/000264 mailed Oct. 12, 2005, 9 pgs.
Office Action from 200580048940.7 mailed Oct. 10, 2008, 16 pgs.
Notice of Preliminary Rejection from 10-2007-7022329 mailed Nov. 19, 2008, 5 pgs.
Office Action from 200480044672.7 mailed May 16, 2008, 18 pgs.
International Preliminary Report on Patentability from PCT/CN2004/001586 mailed Jul. 12, 2007, 6 pgs.
International Search Report and Written Opinion from PCT/CN2004/001586 mailed Oct. 20, 2005, 10 pgs.
Office Action from Foreign Counterpart China Serial No. 200480044672.7 mailed Jun. 5, 2009, 11 pgs.
Examination Report for GB Patent Application No. GB0718501.0 mailed Apr. 27, 2009, 2 pgs.
Notice of Preliminary Rejection from 10-2007-7022329 mailed Jun. 22, 2009, 8 pgs.
Office Action from 200580048940.7 mailed May 8, 2009, 11 pgs.
Official European Search Report for EP Application No. 05714795.1 Mailed Jan. 25, 2012, 3 pages.
Office Action from EP Application No. 05714795.1 Mailed May 2, 2012, 6 pages.
First Office Action from CN Application 201110158832.2 Mailed May 15, 2012, 8 pages.

* cited by examiner

REMOTE LOGGING MECHANISM

CROSS-REFERENCE TO OTHER APPLICATIONS

This is a National Phase of International Application No. PCT/CN2004/001586, filed on Dec. 31, 2004, which claims priority of this date.

FIELD

At least one embodiment pertains to computer systems, and more particularly, to remotely logging debug information of computer code executing on a computer system.

PRIOR ART AND RELATED ART

As computer code becomes more complex, code debugging, including driver and program code, is becoming harder to accomplish. In remote computing situations debugging code becomes even harder as the necessary information is not always sent to the remote programmer to aid in the debugging process.

Currently, debug information is sent either to the display of the computer executing the code or transmitted to a file using a serial port. Debugging by sending information to the screen is accomplished by using a print function in program code. This print function runs a debug sub-function upon the occurrence of a program error during execution of the code. Execution of the code is halted during this debug process. Using a print library the debug process can proceed in one of two directions. It can use the print library and the console library and generate a file using a serial port driver. A serial port, a UART (Universal Asynchronous Receiver-Transmitter) device, is limited to a speed of about 115,200 bits per second. This speed is much slower than the speed of the program being debugged and may cause even more errors to occur because of this delay. Once the data is written to a local file, execution of the program code is resumed.

The print library may also utilize a graphics accelerator (GA) library. The GA library controls a display adaptor driver. Debug information is sent to the display using this driver. However, usually the display is too small to hold all of the necessary information and the display may be difficult to read. Once the data is written to the display, execution of the program code is resumed.

Additionally, these print functions use a lot of system time and resources which may delay later code from executing. This delay could effectively hide later problems in the code, especially if the program runs in a real-time environment.

DETAILED DESCRIPTION

A method and system for a manageability extension mechanism for computer system firmware are described below. In the following description, numerous specific details are set forth, such as embodiments pertaining to the Extensible Firmware Interface (EFI) framework specification, in order to provide a thorough understanding of the present invention. It will be apparent to one skilled in the art, that the present invention may be practiced without these specific details. In other instances, well-known designs and implementations are not described in detail in order to facilitate description.

Figure 1:
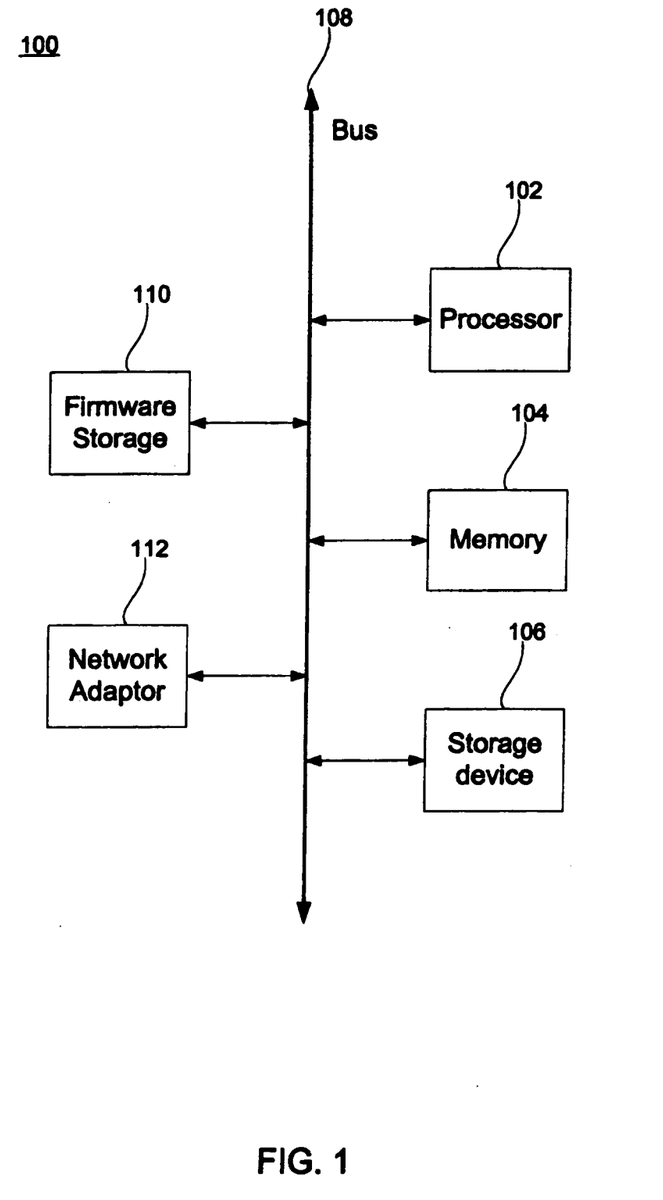
FIG. 1 is a schematic diagram illustrating one embodiment of a computer system in accordance with an embodiment of the invention.

FIG. 1 depicts a computer system 100 in accordance with an embodiment of the invention. The computer system 100 includes a processor 102, a memory 104, a firmware storage 110 coupled to a bus 108, and a network adaptor 112. Exemplary computer systems 100 may include, but are not limited to, a personal computer, a network workstation, a portable computer, a handheld or palmtop computer, a personal digital assistant (PDA), a wireless communication device, a videogame system, and a digital camera.

Firmware storage 110 is a non-volatile storage device including, but not limited to, a flash memory device, an Erasable Programmable Read Only Memory (EPROM), and an Electronically Erasable Programmable Read Only Memory (EEPROM). Firmware storage 110 at least stores a firmware image which includes instructions and/or data executable by computer system 100. In one embodiment, the firmware image includes BIOS firmware for a personal computer. In another embodiment, the firmware image includes firmware stored in a firmware storage device of an expansion board installed on a personal computer. In yet another embodiment, firmware image is firmware stored in a firmware storage device of a wireless phone, PDA, or a digital camera.

In one embodiment, firmware storage 110 includes instructions and/or data in accordance with an EFI framework specification. Today's firmware architectures include provisions for extending BIOS functionality beyond that provided by the BIOS code stored in a platform's BIOS device (e.g., flash memory). More particularly, the Extensible Firmware Interface enables firmware, in the form of firmware modules and drivers, to be loaded from a variety of different resources, including primary and secondary flash devices, option ROMs (Read-Only Memory), various persistent storage devices (e.g., hard disks, CD ROMs (Compact Disk-Read Only Memory), etc.), and even over computer networks. In one implementation of the EFI framework, the initialization process includes various execution phases of firmware stored on the computer system 100. These execution phases include a Pre-EFI Initialization (PEI) phase, a Driver execution Environment (DXE) phase, and an EFI 1.0 execution phase. These phases enable initialization and set-up of various platform devices and services, and enable an operating system to be booted in accordance with an OS launch phase that follows the EFI 1.0 execution phase.

In one embodiment, the firmware storage 110 is a flash memory device. Those skilled in the art will understand that other types of persistent storage devices for maintaining firmware code and/or data may be used and that the embodiments using flash devices discussed herein are merely exemplary.

Flash memory is a non-volatile memory technology that allows manufacturers and (with the appropriate hardware/software) end-users to electrically erase and re-program information. Flash memory is typically erased in units of memory called blocks instead of being erased at the bit level, wherein all bits in a given block are switched to a predetermined polarity (i.e., logic level) when the block is erased. In one embodiment, the block size is 64 k. In another embodiment, the block size is 32 k. In one common type of flash memory, such as flash memory devices manufactured by the Intel Corporation, blocks of memory are erased electronically by setting all bits in a block to 1's. Data can then be written to the block by flipping individual bits to 0's to form appropriate bit patterns corresponding to the data. In other types of flash devices, the erased logic state is all 0's, and writing data to these devices comprises changing individual bits to 1's. It is noted that in conventional flash devices, individual bits cannot be flipped from a changed (i.e., set) logic level back to the erased logic level; in order to update data in a block, all of the bits have to be erased first, and then rewritten.

A storage device 106 is coupled to bus 108, in accordance with one embodiment. Exemplary storage devices include, but are not limited to, magnetic drives, optical drives, or the like. In an alternative embodiment, storage 106 is not part of computer system 100, but accessible by computer system 100.

A network adaptor 112 is coupled to the bus 108. A network adaptor, or network interface card (NIC), makes a connection between the computer system 100 and a network. Wired NICs typically use an Ethernet connection and are available in 10, 100, and 1000 Base-T configurations. A 100-Base-T card can transfer data at 100 Mbps. Wired NICs may use the ISA, PCI, PCMCIA, or PCI Xpress bus. Wireless NICs also allow connection to a network using wireless specifications such as the IEEE 802.11 family and Bluetooth (IEEE 802.15). In one embodiment, the network adaptor 112 supports the EFI framework.

In one embodiment, if there are multiple network adaptors 112 the user may determine to use any network adaptor. However, the user is required to configure the running environment first. For example, a toolkit can be used. An exemplary configuration instruction may take the form of netdebugcfg -s "eth0 514 192.168.0.1 514." The parameter "-s" means to use remote logging described herein. Parameter "eth0" means choosing the network adaptor named eth0 as the communication device. The first "514" indicates that the local port equals "514." Those skilled in the art will note that port is generally associated with UDP. Parameter "192.168.0.1" indicates the IP address of the machine on which program is running, and the last parameter, "514", indicates the remote port.

Traditionally, a BIOS does not provide networking functionality. In one embodiment, a BIOS is reconstructed to provide that functionality. In another embodiment, the EFI framework is used in addition to BIOS. One embodiment of the EFI framework has a BSD (Berkeley Software Distribution) socket compatible interface incorporated into a port of the FreeBSD TCP/IPv4 protocol stack, which in turn utilizes the EFI Simple Network Interface (SNI) protocol. The EFI Socket Protocol Interface provides one of the core components of the EFI Application Toolkit. The socket interface is network transport independent. Although most common implementations interface to a TCP/IPv4 network stack, it is just as applicable to a TCP/IPv6, IPX, NetBEUI, or Appletalk network stack. The socket interface is also the de facto standard networking interface for applications. From an EFI perspective, the most important aspect of the architecture is the Socket Protocol Interface specification implemented by the TCP/IPv4 stack. By implementing the EFI Socket Protocol Interface, new and/or different network stack implementations can be run on a platform without requiring a recompile of the applications that use them. The reference TCP/IPv4 network stack is a port of the FreeBSD implementation. This includes implementations of IPv4, TCP, UDP, ARP, and ICMP. The stack also includes support for the Internet Group Management Protocol (IGMP) and the Resource ReSerVation Protocol (RSVP). The stack is implemented as an EFI protocol that is available for concurrent use by an application and one or more EFI protocols. Access to the network stack is through the EFI Socket Protocol Interface. A complete description of the protocol interface can be found in section 3. As with a FreeBSD system, all network stack configuration may be performed at runtime.

Figure 2:
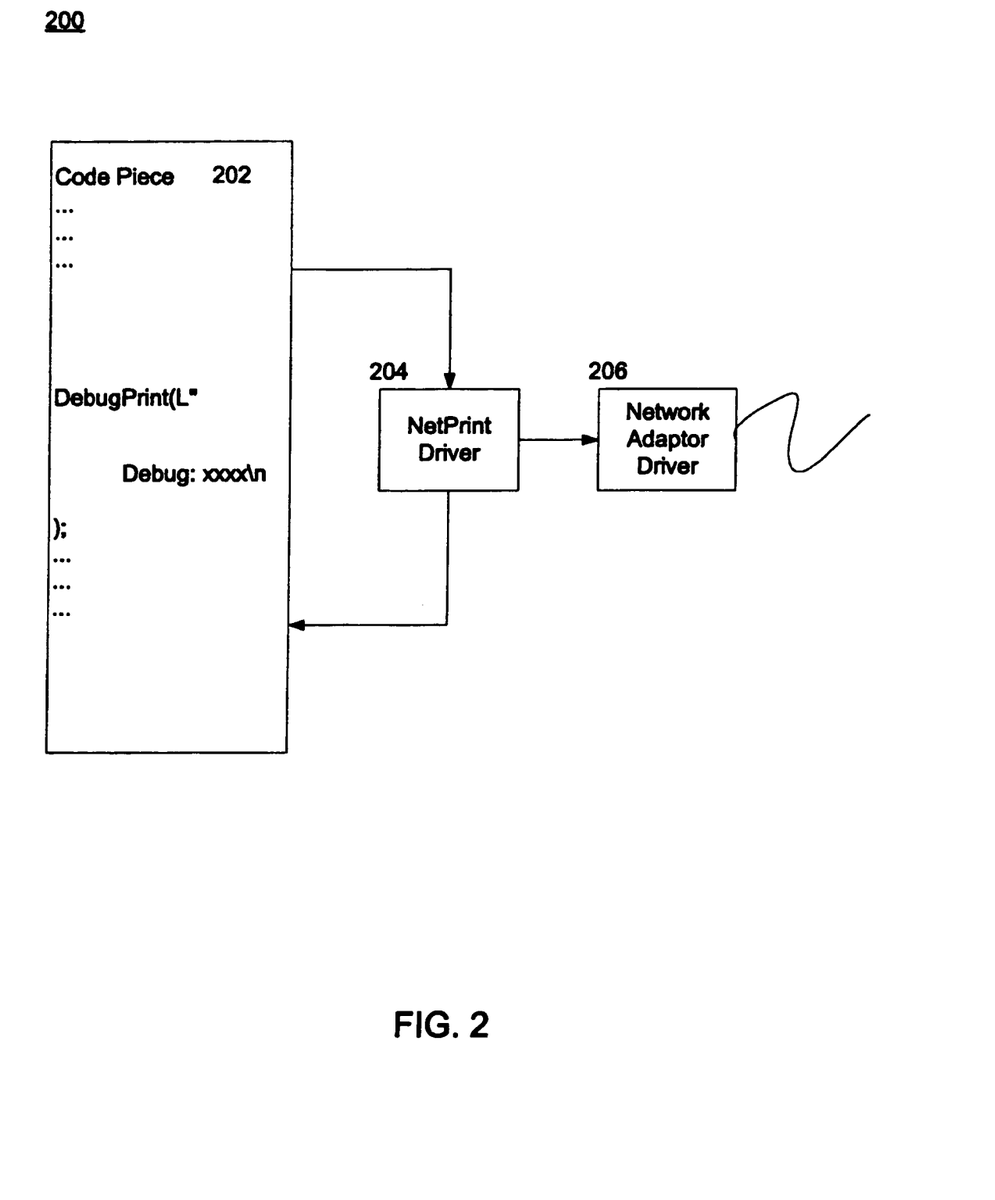
FIG. 2 is a flow diagram illustrating further details of logic and operation performed in accordance with an embodiment of the present invention.

A flow diagram 200 illustrating further details of logic and operation performed in accordance with an embodiment of the present invention is shown in FIG. 2. A computer system runs a program or code piece 202 including a debug print function that runs a debug sub-function upon the occurrence of a program error during execution of the code piece. For illustrative purposes, this computer system will be referred to as the "client." Normal execution of the code piece 202 on the client is halted after an error and the debug function is called. A network print driver (NetPrint) 204, accessible by the executing code 202, is used to transfer debug information from the code 202. In one embodiment, existing program code may be re-compiled to utilize the new debug function. The network print driver 204 receives the debug information and execution of the code piece 202 is immediately resumed.

A network adaptor is accessible by its network adaptor driver 206. The network print driver 204 transmits the debug information to the network adaptor driver 206, which in turn uses the network adaptor to transmit the data to a remote host for storage or logging. For illustrative purposes, the remote host is called a "server." The term "server" includes computer systems capable of receiving this data. This transmitting and storage of data provides the ability to debug and trace executing code remotely at the server. In an embodiment, the running state of an executing program is also accessible remotely through the network adaptor of the client.

Since all debug information is transmitted via the network adaptor directly, instead of other devices commonly used such as a serial port, little of the client's running time is spent transmitting the debug information. For example, a 100 M NIC can send 1 KB packet of data in 70 microseconds, whereas a serial port would transmit that same size packet in 70 milliseconds. The resource needed for the transfer operation is the network adaptor. Therefore, other libraries traditionally used to debug, such as the print library, are not necessary.

In an embodiment, the server has a program designed to monitor network traffic. This program, when executed, gathers and logs the debug information transmitted from the client. The debug information is then accessible by the server. In one embodiment, the server program uses a different color or font to display a message received from the client.

Figure 3:
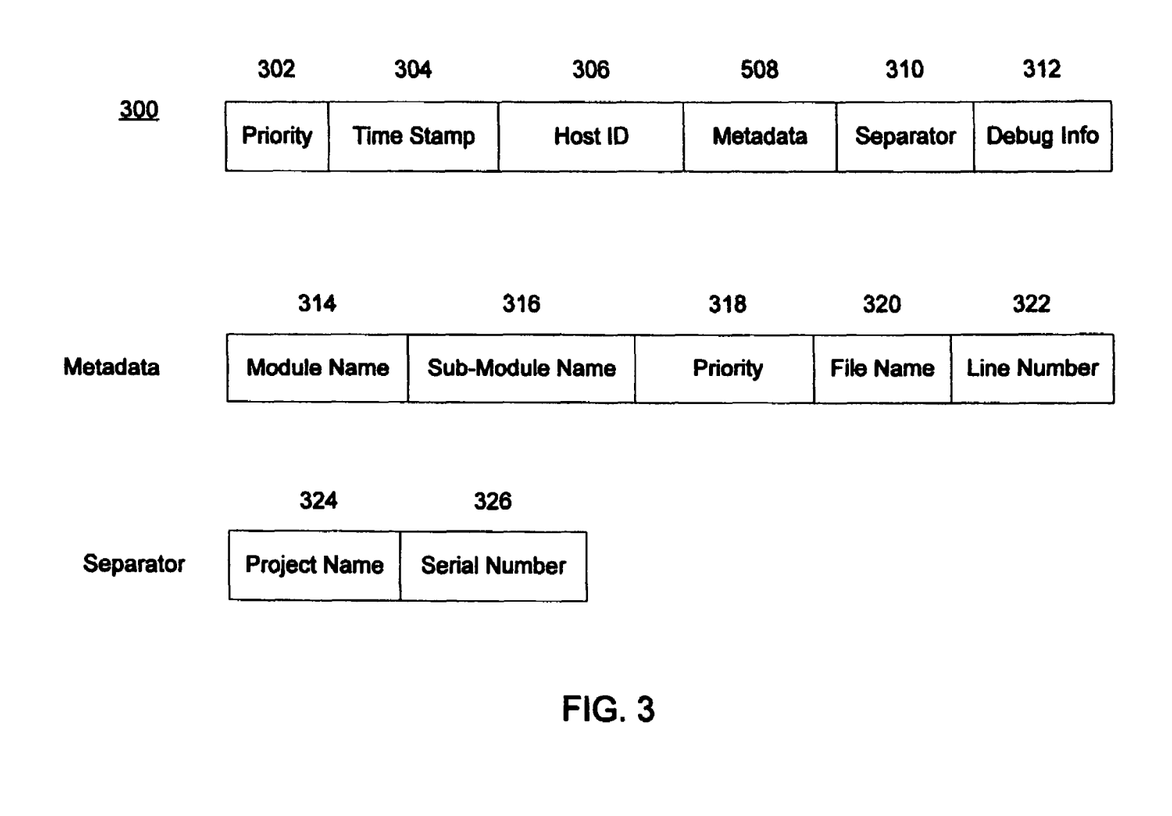
FIG. 3 is a schematic diagram of an embodiment of a debug information node.

An embodiment of a debug information node 300 transmitted from a client to a server is depicted in FIG. 3. A priority (PRI) 302 component indicates the priority of the message. The debug information may also include a time stamp 304 that corresponds to the time and/or date of when the error in the execution of the computer code occurred. A host (client) ID 306 may also be included in the debug information node 300. The host ID 306 uniquely identifies the particular client on the network that transmitted the debug information to the server. This is especially beneficial in highly networked scenarios such as internet cafes, where it could otherwise be hard to determine which client is having a problem with executing code.

One embodiment of the debug information node 300 includes metadata 308. Metadata describes the program context information of this debugging information which is helpful to a developer trying to locate errors in program code. The metadata 308 may include, but is not limited to, the module name 314 and sub-module name 316 of the code, a user definable priority 318, the file name 320 of the code, and line number 322 of the code. Computer code can be divided into several modules or portions. Additionally, each module can be further sub-divided into sub-modules. Module name 314 and sub-module name 316 indicate the particular module or sub-module that is not executing properly.

The debug information node 300 also includes debug information 312. Debug information 312 may contain several characters describing the current values of variables or the state of the system. This is useful to a program developer to trace and debug problems derived from the code. A developer may define the detail of the contents of the debug information according to his/her requirements. The length of the debug information node 300 is limited. The maximum length of the debug information node 300 is the size of the Maximum Transmission Unit (MTU) for the current network interface through which the debug information node 300 is transferred.

In one embodiment, debug information node 300 includes a separator 310. The separator 310 includes a project name 324 and a serial number 326. Items lost in transmission for unknown reasons are found by using the serial number 326. When an information node 300 is ready to be transmitted, a serial number 326 may be assigned. In one embodiment, for the subsequent node, the serial number value is incremented by one. For all nodes 300, the serial numbers should be exclusive. Typically, the nodes 300 are also sequential. A program developer may determine which item of debug information is lost by checking the serial number 326 of each node received.

Figure 4:
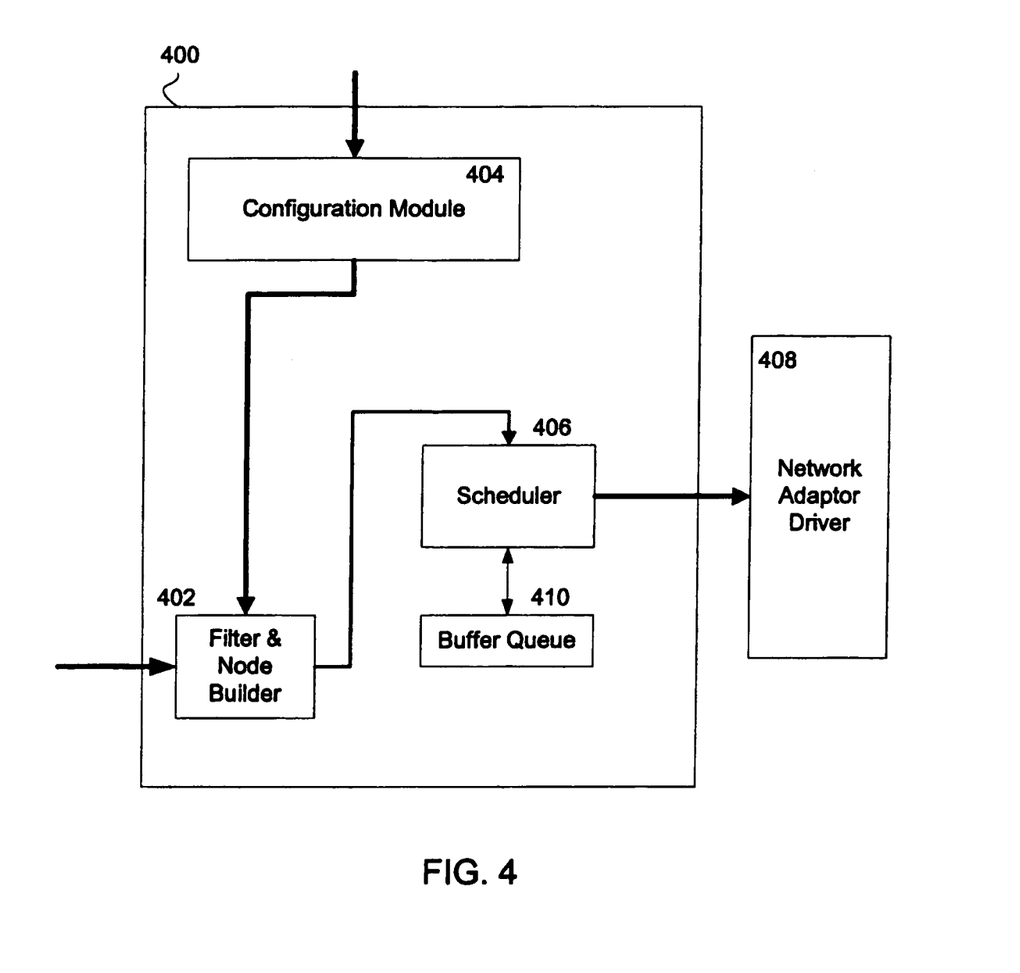
FIG. 4 is a flow diagram illustrating further details of logic and operation performed in accordance with an embodiment of the present invention.

A flow diagram illustrating further details of logic and operation performed in accordance with an embodiment of the present invention is shown in FIG. 4. In one embodiment of the network print driver 400, a filter and node builder 402 provides the ability to filter incoming debug information according to configuration parameters stored in the configuration module 404. The filter and node builder 402 may also utilize the parameters from the configuration module 404 to construct a node of debug information. In an embodiment, the node of debug information is a packet suitable for transmission. In another embodiment, the node of debug information must be broken down into packets.

The configuration module 404 provides a user interface capable of receiving instructions from a user for configuring the filter and node builder 402. Configurable elements include, but are not limited to, module name, sub-module name, user defined priority, file name, line number, project name, and serial number.

The filter and node builder 402 uses parameters of the configuration module 404 to help filter incoming debug information. For example, for a given debug information input into the filter and node builder 402, the module name, sub-module name, and user defined priority of the debug information are compared with the values set for these elements in the configuration module 404. If these values match, the debug information is accepted by the filter and node builder 402. If these values do not match, the filter and node builder 402 does not accept the debug information as being valid.

In one embodiment, a scheduler 406 transmits a node created by the filter and node builder 402 to the network adaptor driver 408. If the node fails to transmit, it is saved in a buffer queue 410. Reasons for a node to fail to transmit include, but are not limited to, the network adaptor driver or network adaptor not functioning properly, the network adaptor missing, too much traffic on the network for the network adaptor to operate, loss of power to the server or client, and the network being down. In another embodiment, there is no buffer queue 410 and failed node transfers are simply ignored.

In one embodiment, the buffer queue 410 is stored in a non-volatile memory. Nodes stored in a buffer queue 410 of non-volatile memory can be retained even if power is removed from the client. This allows the scheduler 406 to attempt to retransmit a node after power is restored to the client without losing debug information gathered while the client was operational. In another embodiment, the buffer queue 410 is stored in a volatile memory.

Nodes stored in the buffer queue 410 may be retransmitted by the scheduler 406 at a later time. For example, when the network is not as congested with traffic, the scheduler gathers a node stored in the buffer queue 410 and attempts to retransmit the node.

In one embodiment, the program code executing on the client includes instructions for creating the debug information node. In this embodiment, the configuration module and filter and node builder are included. The program code creates the debug information node and sends the node to the scheduler 406.

In one embodiment, the communication protocol used to transmit the debug information packet from the client to the server is a common network protocol including, but not limited to, UDP and TCP of TCP/IP. The protocol used should ensure that the information sent from the client arrives to the server. If the protocol can go through different subnet, or the internet, the client and server can be placed far away from each other.

In one embodiment, the debug information packets are in the format of SYSLOG protocol, which is based on the UDP protocol. The SYSLOG protocol is commonly used as the kind of network management format in many occasions. In this embodiment, SYSLOG is used as the communication protocol because at the user end, there are client tools that can be used to receive and show the detail content of the trace/debug information. However, traditional SYSLOG does not provide all of the information that may be provided by a debug information node. Traditionally, SYSLOG lies on top of the UDP layer, whereas in this embodiment, only the driver of the network adaptor is needed.

Figure 5:
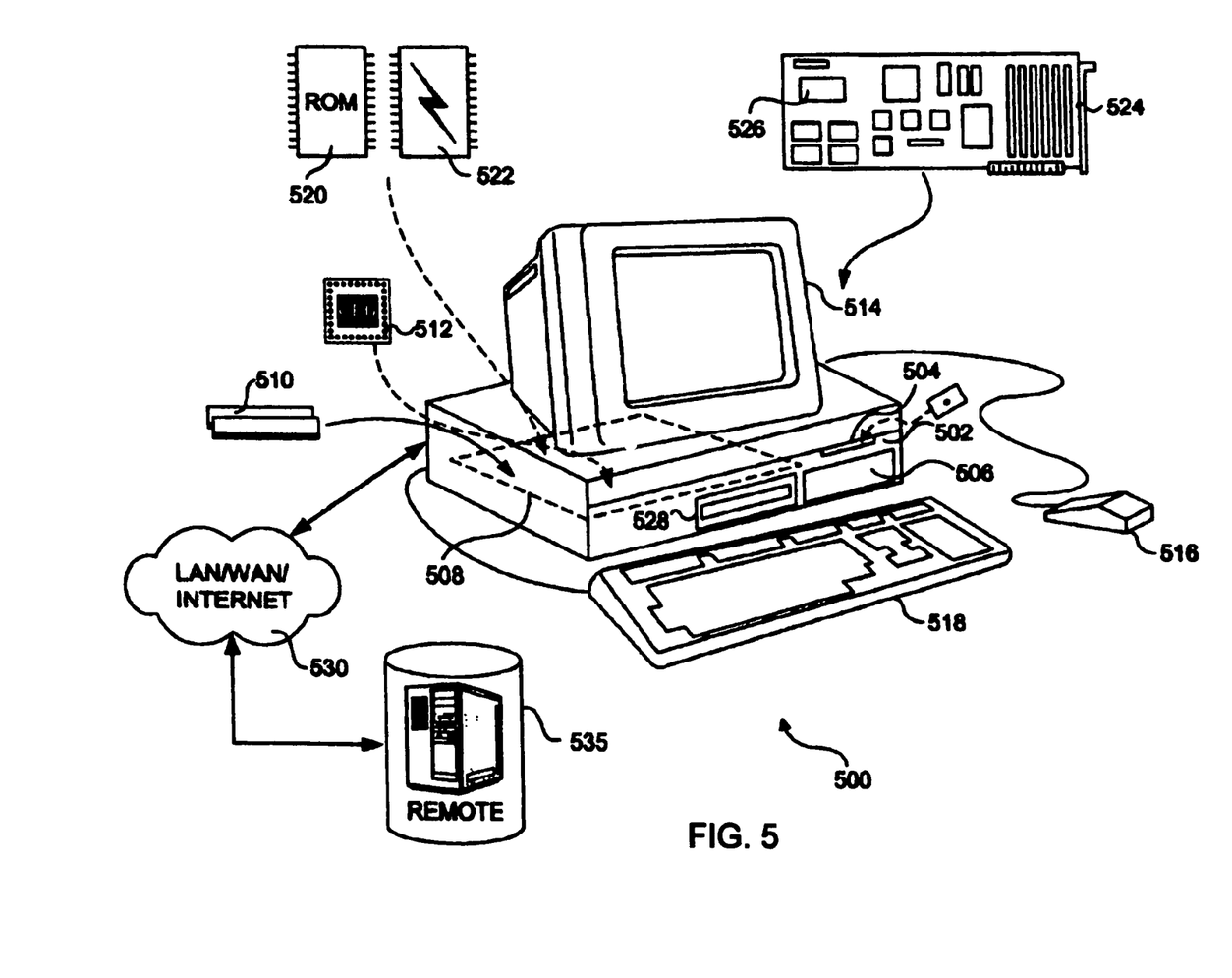
FIG. 5 is a diagram illustrating an embodiment of a computer system for implementing an embodiment of the present invention.

FIG. 5 illustrates an embodiment of an exemplary computer system 500 for practicing an embodiment of the invention described herein. Computer system 500 is generally illustrative of various types of computer devices, including personal computers, laptop computers, workstations, servers, etc; for simplicity, only the basic components of the computer system are discussed herein. Computer system 500 includes a processor chassis 502 in which various hardware components are housed, including a floppy disk drive 504, a hard disk 506, a power supply (not shown), and a motherboard 508 populated with appropriate integrated circuits including system memory 510 coupled to one or more processors 512. Memory 510 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 512 may be a conventional microprocessor including, but not limited to, an Intel Corporation x86, Pentium, XScale, or Itanium family microprocessor, a Motorola family microprocessor, an IBM PowerPC microprocessor, or the like. Hard disk 506 may comprise a single unit, or multiple units, and may optionally reside outside of computer system 500. The system also includes a boot firmware device on which firmware is stored, which may typically comprise non-volatile memory such as a ROM device 520 or a flash device 522. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 514 is included for displaying graphics and text generated by firmware, software programs and program modules that are run by computer system 500, such as system information presented during system boot. A mouse 516 (or other pointing device) may be connected to a serial port, USB port, or other like bus port communicatively coupled to CPU(s) 512. A keyboard 518 is communicatively coupled to motherboard 508 in a similar manner as mouse 516 for user entry of text and commands. In one embodiment, computer system 500 also includes a network interface card NIC or built-in NIC interface (not shown) for connecting computer system 500 to a computer network 530, such as a local area network (LAN), wide area network (WAN), or the Internet.

The illustrated embodiment further includes an optional add-in card 524 that is coupled to an expansion slot of motherboard 508. In one embodiment, add-in card 524 includes an Option ROM 526 on which firmware is stored. Computer system 500 may also optionally include a compact disk-read only memory ("CD-ROM") drive 528 into which a CD-ROM disk may be inserted so that executable files, such as an operating system, and data on the disk can be read or transferred into system RAM 510 and/or hard disk 506. Other mass memory storage devices may be included in computer system 500.

In another embodiment, computer system 500 is a handheld or palmtop computer, which are sometimes referred to as personal digital assistants (PDAs), that may be used with the present invention. Handheld computers may not include a hard disk or other mass storage, and the executable programs are loaded from a corded or wireless network connection into memory 510 for execution by processor 512. A typical computer system 500 will usually include at least a processor 512, memory 510, and a bus (not shown) coupling the memory 510 to the processor 512.

It will be appreciated that in one embodiment, computer system 500 is controlled by operating system software that includes a file management system, such as a disk operating system, which is part of the operating system software. For example, one embodiment of the present invention utilizes Microsoft Windows as the operating system for computer system 500. In another embodiment, other operating systems such as, for example, but not limited to the Apple Macintosh operating system, the Linux operating system, the Microsoft Windows CE operating system, the Unix operating system, the 3Com Palm operating system, or the like may also be used in accordance with the teachings of the present invention.

Thus, embodiments of this invention may be used as or to support a firmware and software code executed upon some form of processing core (such as processor 512) or otherwise implemented or realized upon or within a machine-readable medium. A machine-readable medium includes any mechanism for storing or transmitting information in a form readable by a machine (e.g., a computer). For example, a machine-readable medium can include, but not limited to, a read only memory (ROM), a random access memory (RAM), a magnetic disk storage media, an optical storage media, a flash memory device, or the like. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
executing a program code on a first computer system;
halting execution of the program code upon an occurrence of an error during execution;
generating debug information upon the occurrence of the error during execution of the program code, wherein generating debug information is performed by executing a function call in the program code to a network print driver, wherein the debug information includes metadata that describes program context information to facilitate locating of errors relating to the program code, wherein an error is assigned a timestamp corresponding to a time or a date indicating when the error occurred during execution of the program code, wherein the debug information further includes user-defined data to customize contents of the debug information as defined by a user, wherein the user-defined data comprises details relating to the contents of the debug information, wherein tracing or debugging of problems derived from the program code are performed based on the customized contents and in accordance with the user-defined data;
transmitting the debug information to the network print driver;
automatically resuming execution of the program code after transmitting the debug information to the network print driver; and
transmitting the debug information to a second computer system via a network adaptor.

2. The method of claim 1, further comprising:
building a debug information node from the debug information.

3. The method of claim 2, wherein the debug information node includes data selected from one or more of a priority, the time stamp, a host ID, the metadata, and a separator.

4. The method of claim 3, wherein the metadata includes data selected from one or more of a module name, a submodule name, the priority, a file name, and a line number.

5. The method of claim 4, wherein the separator includes data selected from a project name or a serial number, wherein the serial number is used to find items of the debug information lost for unknown reasons during the transmission of the debug information.

6. The method of claim 2, wherein the first computer system is operable in accordance with the Extensible Firmware Interface (EFI) framework specification.

7. The method of claim 6, further comprising:
buffering the debug information node into a non-volatile memory upon failure to transmit the debug information node from the first computer system to the second computer system; and
re-attempting to transfer the debug information from the buffer to the second computer system.

8. The method of claim 6, further comprising:
monitoring at the second computer system traffic of a network for a debug information node from a second computer system; and
receiving the debug information node from the first computer system.

9. A method comprising:
receiving debug information from a computer program at a filter and node builder upon an occurrence of an error during execution of the computer program;
building a node of debug information using configurable parameters from a configuration module, wherein the configurable parameters are selected from one or more of a priority, a time stamp, a host ID, metadata, a separator, a module name, a sub-module name, a priority, a file name, a line number, a project name, and a serial number, wherein the debug information is filtered at the filter and node builder using the configuration parameters from the configurable module;
transmitting the node through a network adaptor using a scheduler without user intervention, wherein the filter and node builder is further used to construct a node of the debug information, wherein the node is broken down into packets suitable for transmitting the node; and
buffering the node into a storage device upon failure to transmit the node through the network adaptor.

10. A non-transitory computer-readable storage medium on which a plurality of instructions are stored, wherein the instructions when executed cause a processor to perform a method comprising:
executing a program code in a first computer system;
halting execution of the program code upon an occurrence of an error during execution;
generating debug information upon the occurrence of the error during execution of the program code, wherein generating debug information is performed by executing a function call in the program code to a network print driver, wherein the debug information includes metadata that describes program context information to facilitate locating of errors relating to the program code, wherein an error is assigned a timestamp corresponding to a time or a date indicating when the error occurred during execution of the program code, wherein the debug information further includes user-defined data to customize contents of the debug information as defined by a user, wherein the user-defined data comprises details relating to the contents of the debug information, wherein tracing or debugging of problems derived from the program code are performed based on the customized contents and in accordance with the user-defined data;
transmitting the debug information to the network print driver;
automatically resuming execution of the program code after transmitting the debug information to the network print driver; and
transmitting the debug information to a second computer system via a network adaptor.

11. The non-transitory computer-readable storage medium of claim 10, wherein the debug information node includes data selected from one or more of a priority, the time stamp, a host ID, the metadata, and a separator.

12. The non-transitory computer-readable storage medium of claim 11, wherein the metadata includes data selected from one or more of a module name, a sub-module name, the priority, a file name, and a line number.

13. The non-transitory computer-readable storage medium of claim 11, wherein the separator includes data selected from a project name or a serial number, wherein the serial number is used to find items of the debug information lost for unknown reasons during the transmission of the debug information.

14. The non-transitory computer-readable storage medium of claim 10, wherein the first computer system is operable in accordance with the Extensible Firmware Interface (EFI) framework specification.

15. A computer system comprising:
a processor;
a network adaptor operatively coupled to the processor;
at least one flash device operatively couple to the processor on which firmware instructions are stored; and
at least one storage device on which computer program code is stored, which when executed by the processor performs operations comprising:
receiving debug information from a computer program upon the occurrence of an error during execution of the program code;
applying configuration parameters to the debug information to create a debug information node, wherein the debug information node includes data selected from one or more of a priority, a time stamp, a host ID, metadata, a separator, a module name, a sub-module name, a priority, a file name, a line number, a project name, and a serial number, wherein the debug information is filtered at the filter and node builder using the configuration parameters from the configurable module;
transmitting the debug information node via the network adaptor to a remote computer without user intervention, wherein the filter and node builder is further used to construct a node of the debug information, wherein the node is broken down into packets suitable for transmitting the node; and
buffering the node into a storage device upon failure to transmit the node through the network adaptor.

16. The computer system of claim 15, wherein the firmware operates in accordance with the Extensible Firmware Interface (EFI) framework specification.

17. The computer system of claim 15, wherein the network adaptor comprises a wired Ethernet card or a wireless Ethernet card.

18. The computer system of claim 16, further comprising a user interface to set the configuration parameters.

19. A non-transitory computer-readable storage medium on which a plurality of instructions are stored, wherein the instructions when executed cause a processor to perform a method comprising:
receiving debug information from a computer program at a filter and node builder upon an occurrence of an error during execution of the computer program;
building a node of debug information using configurable parameters from a configuration module, wherein the configurable parameters are selected from one or more of a priority, a time stamp, a host ID, metadata, a separator, a module name, a sub-module name, a priority, a file name, a line number, a project name, and a serial number, wherein the debug information is filtered at the filter and node builder using the configuration parameters from the configurable module;

transmitting the node through a network adaptor using a scheduler without user intervention, wherein the filter and node builder is further used to construct a node of the debug information, wherein the node is broken down into packets suitable for transmitting the node; and buffering the node into a storage device upon failure to transmit the node through the network adaptor.

20. An apparatus comprising:

a storage device having instructions; and a processor coupled with the storage device, the processor execute instructions to perform one or more operations comprising:

receiving debug information from a computer program at a filter and node builder upon an occurrence of an error during execution of the computer program;

building a node of debug information using configurable parameters from a configuration module, wherein the configurable parameters are selected from one or more of a priority, a time stamp, a host ID, metadata, a separator, a module name, a sub-module name, a priority, a file name, a line number, a project name, and a serial number, wherein the debug information is filtered at the filter and node builder using the configuration parameters from the configurable module;

transmitting the node through a network adaptor using a scheduler without user intervention, wherein the filter and node builder is further used to construct a node of the debug information, wherein the node is broken down into packets suitable for transmitting the node; and buffering the node into a storage device upon failure to transmit the node through the network adaptor.

\* \* \* \* \*